Patented Dec. 4, 1951

2,577,218

UNITED STATES PATENT OFFICE 2,577,218

EMULSIONS

Mathijs van der Waarden, Amsterdam, Netherlands, assignor to Shell Development Company, San Francisco, Calif., a corporation of Delaware No Drawing. Application December 15, 1947, Serial No. 791,940. In the Netherlands December 19, 1946

8 Claims. (Cl. 252—312)

This invention relates to aqueous emulsions. More particularly this invention pertains to non-gel forming compositions which are capable to form water-in-oil emulsions suitable for use in numerous industrial processes and in various commercial fields, such as in the manufacture of cosmetics and pharmaceutical products.

It is known to utilize wool-fat, wool grease, degras or lanolin as emulsifiers in the manufacture of emulsions because of their solubilizing and surface-active properties which promote the formation of stable water-in-oil type emulsions. This apparent inherent property of the above referred to materials is sometimes attributed to the waxy fractions which consist mainly of high-molecular weight or long chain alcohols, such as cholesterin, iso-cholesterin, oxycholesterin alcohols, and derivatives thereof. The fatty acids from wool fats, when saponified, are also utilized in making various substances which are insoluble, or substantially insoluble, emulsifiable in water and aqueous mediums.

Although the above referred to materials are excellent emulsifiers some of them, such as certain soaps of acids from wool fat, have limited utility as emulsifiers because of their gel forming tendencies. Thus fluid compositions capable of forming water-in-oil emulsions and containing as the emulsifier derivatives of wool fat, such as alkali metal soaps of wool fat acids, tend to gel quickly so that they lose their fluidity and thus become quite useless where fluid compositions are required.

It is an object of the present invention to prepare non-gel forming compositions, capable of forming water-in-oil emulsions. Still another object of this invention is to provide a new non-gel forming composition capable of forming emulsions suitable for various industrial and non-industrial purposes. A further object of this invention is to provide a non-gel forming composition capable of forming water-in-oil emulsions, which is stable for long periods of time under various conditions of temperature modification. Furthermore it is an object of this invention to provide a stable, non-gel forming composition capable of forming water-in-oil emulsions, which is non-corrosive and has little tendency to oxidize. Still further it is an object of this invention to provide a new non-gel forming composition having a special type of emulsifier in combination with a specific type of gel inhibitor. These and other objects of this invention will be apparent from a description of the appended claims.

It has now been discovered that stable, non-gel forming compositions, capable of forming non-corrosive water-in-oil emulsions, may be prepared by utilizing as the emulsifier free degras fatty acids, said composition being inhibited against gelation by addition to said composition of a minute amount of rosin and derivatives thereof. In referring to degras fatty acids as emulsifiers of this invention it is intended to include within the scope of these materials acids derived from wool fat, wool grease, lanolin and the like. The term "degras fatty acids" is therefore used for convenience and is not to be used in its restrictive sense other than that referred to in the preceding sentence.

The degras fatty acids are obtained from degras by various means or may be purchased on the market. Typical degras fatty acids can be prepared in the following manner. A specimen of wool grease is saponified under pressure with alcoholic potassium hydroxide. The unsaponified material is removed from the saponified material by any suitable means, such as solvent extraction or the like. The fatty acids can be recovered by acidifying the soap with mineral acid and extracting the fatty acids with a solvent. The fatty acids thus recovered consist primarily of high-molecular weight carboxylic acids and oxycarboxylic acids with more or less branched carbon chains.

The fatty acids thus recovered vary in neutralization number over rather wide limits. Thus the neutralization number of degras fatty acids may vary from 86 to 170. This variation is believed to be associated with the nature of the degras itself, the method of refining the degras, and the method of preparing the fatty acids. However, regardless of the neutralization number of the degras fatty acids they may all be used as the emulsifiers of this invention.

The amount of degras fatty acids that can be added to an oleaginous material to be emulsified may vary over wide limits, and depends on the nature of the oleaginous material and the water content desired in the final water-in-oil emulsion. Generally between about 0.5% and 15% and preferably between about 1% and 5% by weight of the degras fatty acid, calculated on the oleaginous material used, may be utilized with excellent results.

To prevent gelation of the above referred to compositions a very minute amount of rosin material and/or their derivatives is added to said compositions. The amount of rosin material used to effectively inhibit gelation of compositions of this invention may vary from between about 0.02% to 5% and preferably between about 0.1% and 1% by weight.

The materials which may be used as anti-gel agents in compositions of this invention may include rosin and/or derivatives such as rosin or colophony, resinoic acids, rosin acids, abietic acid, terpenylic acid, hydrogenated abietic acid, pine oil, polymerized pine oil, turpentine, and mixtures thereof.

In forming the water-in-oil emulsion various petroleum hydrocarbon oils of low and high viscosity can be used. In addition, animal, vegetable and/or marine oils can be used in forming the water-in-oil emulsion as well as mixtures of natural fixed fatty oils and petroleum hydrocarbon oils.

The emulsifying compositions of this invention may contain, in addition to the ingredients described above, other ingredients known to be useful in emulsifying compositions and possessing certain properties so as to render the compositions more useful for certain industrial or non-industrial purposes. Materials which can be added are one or more naphthenic acids, sulfonic acids, fatty acids, e. g. oleic, stearic, ricinoleic acids, or polyvalent metal salts of said acids or polyvalent metal soaps derived from tall oil, fish oils, vegetable oils, animal oils and various fractions of said oils. Among the oils as well as acidic fractions thereof which can be used to form the salts or soaps are: castor oil, cocoanut oil, corn oil, cottonseed oil, lard oil, neat's-foot oil, palm oil, peanut oil, rapeseed oil, soya bean oil, sperm oil, whale oil, and the like. Other substances which can be added are blown unsaturated fatty oils, such as blown rapeseed oil or train oil.

One or more organic solvents may be added to compositions of this invention and may include alcohols, glycols, e. g. diethylene glycol and their derivatives such as ethylene glycol monoethylether, ethylene glycol monobutyl ether; glycerine mono or polyethers; monoesters of glycol or glycerine, and the like.

In preparing compositions of this invention it is preferable to disperse the required amount of degras fatty acid or wool-fat acids in an oil such as a hydrocarbon oil or a natural fixed fatty oil, or a mixture of said oils, and the mixture of degras fatty acid and oil is heated to a moderately elevated temperature of between about 50° and 100° C. or higher. After the degras fatty acid has been completely dispersed or dissolved in the oil or oil mixtures, the desired amount of rosin and/or rosin derivatives such as rosin or abietic acid is added to the mixture. If desired, soaps, solvents and the like may be added either to the oil or water phase depending upon their solubility, and the two phases, namely, oil containing degras fatty acid and rosin or its derivatives and water admixed by heat and agitation or by any other suitable method. Preferably it is desirable to add the water phase to the oil composition containing the degras fatty acid and rosin or the like while stirring vigorously. In this way very large quantities of water such as six times the quantity or even more may be taken up, while water-in-oil emulsions are formed.

To more clearly illustrate the present invention, the following examples are presented. It is to be understood however that various modifications can be resorted to without departing from the spirit of the invention.

Example I

Approximately 4 parts by weight of degras fatty acid and about 1 part by weight of colophony were added to about 95 parts by weight of spindle oil while stirring and heating to about 85° C. The mixture thus obtained was a clear oil. When approximately 600 parts of water were used a water-in-oil emulsion having a consistency of a soft paste was obtained having excellent mould lubricant properties.

Example II

Approximately 4 parts by weight of wool-fat acids and about 1 part by weight of rosin acid were dissolved in about 95 parts by weight of white oil while heating and stirring the mixture at a temperature of between about 80° and 100° C. In the mixture thus obtained about 600 parts of water was emulsified to produce a soft paste-like water-in-oil emulsion which is very suitable for the manufacture of cosmetics or pharmaceutical products.

Emulsions according to this invention are particularly suitable for treating moulds, casings and the like in the concrete industry, in order to prevent concrete adhering to the mould or casing (which generally consists of wood) during the hardening, as a result of which the concrete surface would be damaged when the mould or casing is removed. Emulsions of this invention when spread on the interior of the casing, a very even thin oil-coating is formed on the surface of the mould, which prevents water from the concrete mass penetrating into the mould, thus preventing the concrete from adhering to the mould after hardening. Conventional oil in water emulsions do not function in this manner, and generally involve the risk of having the oil penetrate into the concrete, thus hampering it and making it difficult to be removed from the mould without damaging it.

Compositions of this invention may be applied by any suitable means such as flooding, spraying, brushing, dipping, and the like.

Many modifications and variations of this invention as hereinbefore set forth may be made without departing from the spirit and scope thereof and only such limitation should be imposed as indicated in the appended claims.

I claim as my invention:

1. An oil concentrate capable of forming a stable, non-gelling water-in-oil emulsion, said oil concentrate comprising an oil containing from 0.5% to about 15% of free degras fatty acid fraction of degras and from 0.2% to 5% of colophony.

2. An oil concentrate capable of forming a stable, non-gelling water-in-oil emulsion, said oil concentrate comprising an oil containing from 0.5% to about 15% of free degras fatty acid fraction of degras and from 0.02% to 5% of rosin acid.

3. An oil concentrate capable of forming a stable, non-gelling water-in-oil emulsion, said oil concentrate comprising an oil containing from 0.5% to about 15% of free degras fatty acid fraction of degras and from 0.02% to 5% of abietic acid.

4. An oil concentrate capable of forming a stable, non-gelling water-in-oil emulsion, said oil concentrate comprising an oil containing from 0.5% to about 15% of free degras fatty acid fraction of degras and from 0.02% to 5% of an organic compound selected from the group consisting of colophony, the acidic fractions of said colophony and mixtures thereof.

5. An aqueous stable, non-gelling emulsion comprising from 6 to 600 parts of water and about 1 part of the oil concentrate as covered in claim 1.

6. An aqueous stable, non-gelling emulsion comprising from 6 to 600 parts of water and about 1 part of the oil concentrate as covered in claim 2.

7. An aqueous stable, non-gelling emulsion comprising from 6 to 600 parts of water and about 1 part of the oil concentrate as covered in claim 3.

8. An aqueous stable, non-gelling emulsion comprising from 6 to 600 parts of water and about 1 part of the oil concentrate as covered in claim 4.

MATHIJS van der WAARDEN.

REFERENCES CITED

The following references are of record in the file of this patent:

UNITED STATES PATENTS

| Number | Name | Date |
| --- | --- | --- |
| 1,919,125 | Patch | July 18, 1933 |
| 2,060,425 | Neukom | Nov. 10, 1936 |
| 2,251,824 | Edwards | Aug. 5, 1941 |
| 2,316,752 | Atkinson | Apr. 20, 1943 |
| 2,400,001 | Grupelli | May 7, 1946 |

OTHER REFERENCES

Lewkowitsch, "Chem. Tech. and Analysis of Oils, Fats and Waxes," vol. III, 1915, p. 438. Copy in Sci. Lib.

"Wool Wax," by D. T. C. Gillespie, Hobart Pub. Co., Inc., Wash., D. C., p. 51.